(12) United States Patent
Picha

(10) Patent No.: US 9,146,897 B2
(45) Date of Patent: Sep. 29, 2015

(54) THUMBTRAPS

(75) Inventor: John William Picha, Frankfort, IL (US)

(73) Assignee: John W Picha, Frankfort, IL (US)

( * ) Notice: Subject to any disclaimer, the term of this patent is extended or adjusted under 35 U.S.C. 154(b) by 319 days.

(21) Appl. No.: 13/273,981

(22) Filed: Oct. 14, 2011

(65) Prior Publication Data

US 2013/0095301 A1    Apr. 18, 2013

(51) Int. Cl.
  *B32B 3/24*    (2006.01)
  *G06F 17/00*    (2006.01)
  *G06F 3/041*    (2006.01)

(52) U.S. Cl.
  CPC ............. *G06F 17/00* (2013.01); *G06F 3/041* (2013.01); *G06F 2203/04809* (2013.01); *Y10T 428/24298* (2015.01); *Y10T 428/24752* (2015.01)

(58) Field of Classification Search
  CPC ............. B32B 3/266; G06F 2203/04809; Y10T 428/24298
  USPC .......................... 428/131; 345/173
  See application file for complete search history.

(56) References Cited

U.S. PATENT DOCUMENTS

| 2005/0000642 A1* | 1/2005 | Everaerts et al. .......... 156/273.1 |
| 2010/0026646 A1* | 2/2010 | Xiao et al. ..................... 345/173 |

* cited by examiner

*Primary Examiner* — William P Watkins, III

(57) ABSTRACT

A Thumbtrap is an ipad accessory, that enhances individual and multi-player game play. It is a non-permanent, reusable vinyl cling that sticks to the smooth glass screen of the ipad without use of adhesives. When placed over an onscreen game control button, a Thumbtrap acts like a small fence that prevents the thumb drift that inevitably occurs during intense game play, and guides the thumb into specified zones over an onscreen button for better button contact accuracy. Thumbtraps can be used with several existing ipad games.

18 Claims, 1 Drawing Sheet

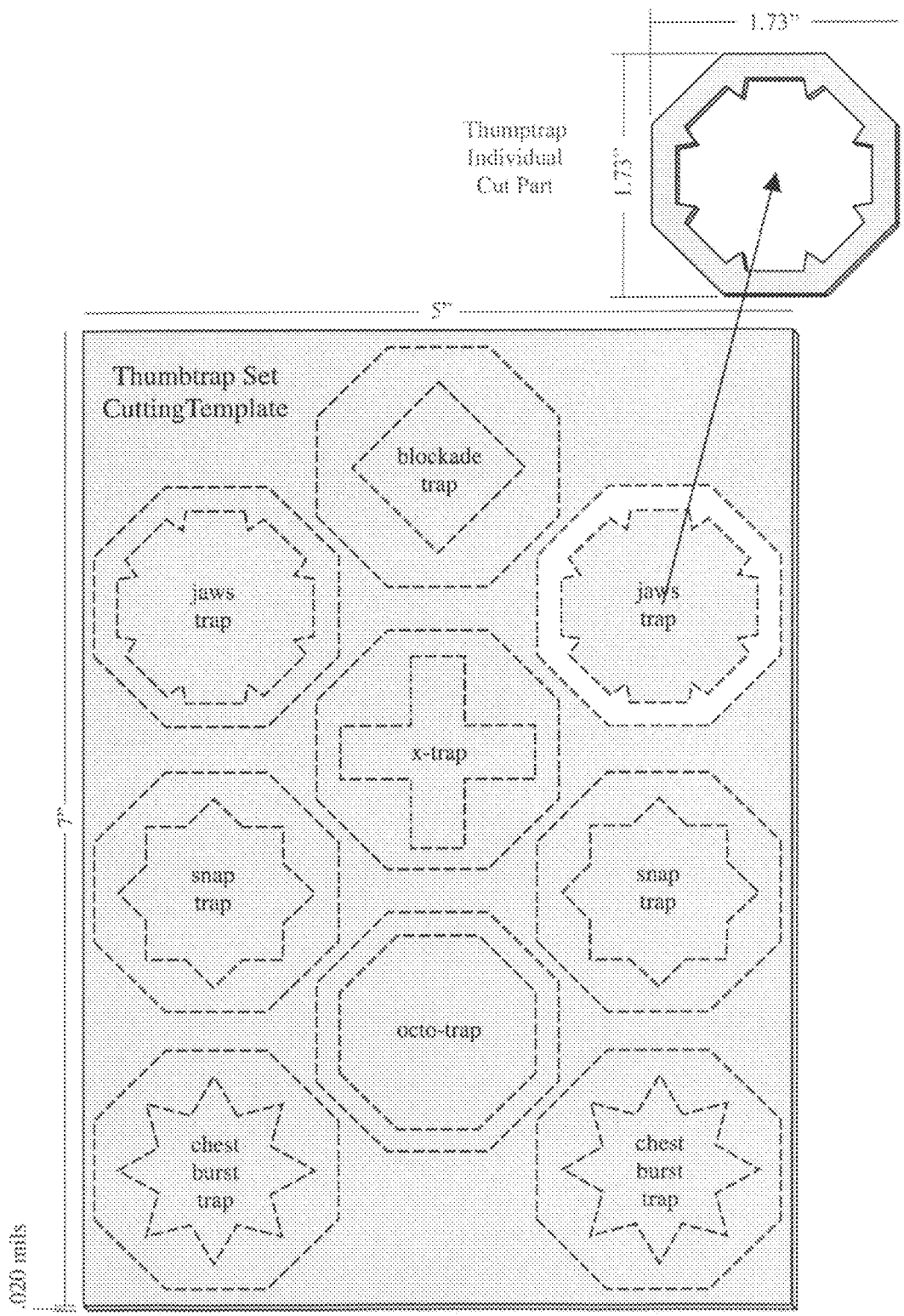

THUMBTRAPS

CROSS-REFERENCE TO RELATED APPLICATIONS

Not Applicable

STATEMENT REGARDING FEDERALLY SPONSORED RESEARCH OR DEVELOPMENT

Not Applicable

TECHNICAL FIELD OF THE INVENTION

The present invention relates generally to handheld mobile electronic devices. More specifically the present invention relates to ipad accessories.

BACKGROUND OF THE INVENTION

While developing a game for the ipad it became clear to me that a player's thumbs have a tendency to drift off of buttons during intense game play, due to the smooth glass surface of the ipad. I set out to devise a method of restricting a players thumb to specified areas of the ipad's screen.

I began experimenting with different vinyl materials that would stick to the smooth glass surface without the need for adhesive. I also played many hours computer games on the ipad and experimented with a wide range of cut pieces and parts before settling on the six main Thumbtrap shapes, which are specified in FIGURE A.

SUMMARY OF THE INVENTION

Thumbtraps are pieces of transparent, vinyl cut into octagon rings. By means of static, Thumptraps clings to the glass screen of an ipad. The center holes in Thumbtraps are cut into 6 unique shapes which, when clung to an ipad's flat, glass screen, create a barrier around a player's thumbs which prevents them from drifting off onscreen buttons during game play. Thumbtraps work with several existing ipad games, especially first person shooter (fps) games.

BRIEF DESCRIPTION OF THE SEVERAL VIEWS OF THE DRAWING

ThumbTraps_Fig_A.pdf is an isometric projection depicting a set of Thumbtraps as they look while in their Vinyl Sheet or Cutting Template. The FIGURE also shows an individual Thumbtrap once removed and ready for use.

DETAILED DESCRIPTION OF THE INVENTION

A Thumbtrap is a 0.020 mil piece of transparent, vinyl cut into 1.73"×1.73" octagon ring. By means of static, a Thumbtrap clings to the glass screen of an ipad. The center holes in Thumbtraps are cut into 6 unique shapes. When clung to an ipad's flat screen, Thumbtraps create a 0.020 mil fence around a player's thumbs which prevents the digits from drifting off onscreen buttons during game-play. Thumbtraps work with several existing ipad games, especially first person shooter (fps) games.

The Thumbtrap's purpose is to help ipad game players keep their thumbs over onscreen buttons. It helps players more easily operate game controls, play better, and achieve higher game scores.

Thumbtraps come in sets of 9 with 6 unique shapes; Jaws-Trap, Blocade-Trap, X-trap, Snap-Trap, Octo-Trap, and Chest-Burst-Trap. (See FIGURE A)

Typically, draggable touchscreen control-button for an ipad game registers finger movement in 8 directions akin to a compass; N, NE, E, SE, S, SW, W, NW. The Thumbtrap's unique shapes provide tracks for a user's thumb to slide into one of the 8 specified zones over onscreen controls.

As a players thumb travels over the onscreen control during game-play, it will make contact with the Thumbtrap border, which indicates the onscreen button's boundary. Then as a player's thumb slides along the inner edge of the Thumbtrap it will travel over the details of the shape's teeth, and gates and be guided into a specified zone marking one of the 8 compass directions by touch.

The Thumbtrap provides better button press accuracy for the ipad game player. Through touch alone, a player will know their position on the screen above the button. As a result the player will be better oriented to the game environment.

For storage, unused Thumptraps are placed on a Thumbtrap Deck which is simply a flat 5"×7" piece of acetate.

Thumbtraps can be die-cut, or hand-cut from 5"×7" vinyl sheets using our Thumbtrap Set Cutting Template as a guide. For die-cutting, the die is pressed into the 0.020 mil sheet of Verilon clear, flexible vinyl film. For hand-cutting, 5"×7" sheets of vinyl are placed over the Thumbtrap Set Cutting Template, then cut through using an x-acto knife, or utility knife.

Once cut, the loose pieces are popped out of the vinyl sheet and positioned on the ipad screen to assist in game-play, or a Thumbtrap Deck for storage.

What is claimed is:

1. A kit for use in guiding a game player's thumb within an area on a touchscreen of a game device, said kit comprising:
   i) a set of Thumbtraps, each Thumbtrap within said set of Thumbtraps being octagonal and incorporating a center hole, each Thumbtrap within said set of Thumbtraps adapted to removably cling to said touchscreen of said game device without adhesive, said center hole enclosed by an inner edge, being in a second geometric shape and adapted to prevent said thumb from drifting off of a draggable onscreen control-button of a game played on said game device.

2. The kit of claim 1, wherein each Thumbtrap within said set of Thumbtraps is a vinyl cling film.

3. The kit of claim 1, wherein said game device is an iPad device.

4. The kit of claim 1, wherein said center hole provides a closed perimeter in which said game player's thumb maneuvers a draggable onscreen-button, wherein said closed perimeter defines a limit to which said draggable onscreen control-button can be dragged, and wherein said closed perimeter identifies eight compass headings from a center position of said closed perimeter, wherein said eight compass headings include N, NE, E, SE, S, SW, W and NW.

5. The kit of claim 1 further comprising a storage deck for storing said set of Thumbtraps, wherein said set of Thumbtraps includes exactly nine Thumbtraps, wherein said center holes of said nine Thumbtraps are in six different polygonal shaped center holes, wherein said set of Thumbtraps includes a cutting guide, and vinyl sheet.

6. The kit of claim 1, wherein:
   i) each Thumbtrap within said set of Thumbtraps is an octagon ring that is 1.73 inches across and 0.020 mils thick;
   ii) said center hole is up to 1.5 inches in diameter;

iii) said inner edge is a raised circumference of said center hole; and iv) said second geometric shape includes a plurality of convex angles, concave angles, or flat edges.

7. The kit of claim 6, wherein said inner edge provides touch-feedback to said touchscreen.

8. The kit of claim 1, wherein said second geometric shape is one of:

i) a Jaws-Trap, wherein said inner edge of said Jaws-Trap is a symmetrical twenty-four point polygonal hole that is defined by sixteen 100-degree concave angles and eight 64-degree convex angles, wherein a maximum diameter of said center hole 1.75 inches;

ii) a Snap-Trap, wherein said inner edge of said Snap-Trap is a symmetrical sixteen point polygonal hole that is defined by eight 90-degree concave angles and eight 225-degree convex angles, wherein a maximum diameter of said center hole is 1.375 inches;

iii) a Chest-Burst-Trap, wherein said inner edge of said Chest-Burst-Trap is a symmetrical sixteen point polygonal hole that is defined by eight 59-degree concave angles and eight 106-degree convex angles. The maximum diameter of said center hole is 1.3125 inches;

iv) an X-Trap, wherein said inner edge of said X-Trap is a symmetrical twelve point polygonal hole that is defined by twelve 90-degree angles, wherein eight of said twelve 90-degree angles are concave gates and four of said twelve 90-degree angles are convex, wherein a maximum diameter of said center hole is 1.375 inches;

v) a Blockade-Trap, wherein said inner edge of said Blockade-Trap is a symmetrical four point polygonal hole that is defined by four 90-degree concave angles, wherein a maximum diameter of said center hole is 1.1875 inches; and vi) an Octo-Trap, wherein said inner edge of said Octo-Trap is a symmetrical eight point polygonal hole that is defined by eight 135-degree concave angles and eight flat edges, wherein a maximum diameter of said center hole is 1.5 inches.

9. The kit of claim 1, wherein said Thumbtraps within said set of Thumbtraps are used in pairs for first-person-shooter games.

10. The kit of claim 1, wherein each Thumbtrap within said set of Thumbtraps is adapted to be placed at multiple positions on said touchscreen, wherein said multiple positions correspond to onscreen control-button locations.

11. The kit of claim 1, wherein each Thumbtrap within said set of Thumbtraps is removable and reusable.

12. The kit of claim 1, wherein each Thumbtrap within said set of Thumbtraps is transparent.

13. The kit of claim 1 further comprising a Thumbtrap Set Cutting Template including said set of Thumbtraps, wherein said set of Thumbtraps is cut from said Thumbtrap Set Cutting Template.

14. The kit of claim 13, wherein said Thumbtrap Set Cutting Template includes a sheet, wherein said sheet:

i) is 5 inches in width, 7 inches in length and 0.020 mils thick;

ii) is made from Verilon vinyl material; and iii) includes guidelines depicting Thumbtraps within said set of Thumbtraps.

15. The kit of claim 14, wherein each Thumbtrap within said set of Thumbtraps is cut from said sheet by hand-cutting or die cutting.

16. The kit of claim 14, wherein octagonal outer edges of Thumbtraps within said set of Thumbtraps allow for efficient arrangement and placement on said sheet and reduce waste of vinyl material.

17. The kit of claim 16, wherein octagonal outer edges of Thumbtraps within said set of Thumbtraps provide a square orientation on a rectangular surface relative to edges of said rectangular surface.

18. The kit of claim 1, wherein each Thumbtraps within said set of Thumbtraps is a toroidal polyhedron.

\* \* \* \* \*